(12) United States Patent
Meier et al.

(10) Patent No.: US 9,839,172 B2
(45) Date of Patent: Dec. 12, 2017

(54) ROTARY SPIDER TINE FOR TILLAGE IMPLEMENT

(71) Applicant: AGCO Corporation, Hesston, KS (US)

(72) Inventors: Joseph Shawn Meier, Beloit, KS (US); Jeffrey Scott Hughes, Glen Elder, KS (US); Donald Eugene Bergmann, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 100 days.

(21) Appl. No.: 14/968,203

(22) Filed: Dec. 14, 2015

(65) Prior Publication Data
US 2016/0183445 A1    Jun. 30, 2016

Related U.S. Application Data

(60) Provisional application No. 62/097,705, filed on Dec. 30, 2014.

(51) Int. Cl.
*A01B 33/10* (2006.01)
*A01B 33/02* (2006.01)
*A01B 35/16* (2006.01)
*A01B 49/02* (2006.01)

(52) U.S. Cl.
CPC .......... *A01B 33/103* (2013.01); *A01B 33/024* (2013.01); *A01B 35/16* (2013.01); *A01B 49/027* (2013.01)

(58) Field of Classification Search
CPC ..... A01B 33/024; A01B 33/021; A01B 33/02; A01B 33/103; A01B 35/16; A01B 49/027
See application file for complete search history.

(56) References Cited

U.S. PATENT DOCUMENTS

| | | | | |
|---|---|---|---|---|
| 1,641,393 | A | * | 9/1927 | Mackie ................ A01B 33/021 172/120 |
| 2,012,434 | A | * | 8/1935 | Pedersen .............. A01B 33/021 172/114 |

(Continued)

FOREIGN PATENT DOCUMENTS

| CN | 202476037 U | 10/2012 |
|---|---|---|
| KR | 20130118504 A | 10/2013 |

OTHER PUBLICATIONS

Intellectual Property Office, International Search report for UK filing of Priority Application No. GB1500835.2, dated Jul. 14, 2015.

*Primary Examiner* — Robert Pezzuto
*Assistant Examiner* — Jessica H Lutz

(57) ABSTRACT

A tillage implement has a gang of rotary spider tines, each spider tine having a center portion and a plurality of teeth forming a peripheral edge of the spider tine. Each tooth is rearwardly curving from the intended direction of rotation and has a curved leading edge and a curved trailing edge that taper to a rounded outward tip. A distal end of each tooth is angled relative to a tooth base to form a flared paddle such that the flared paddle is angled with respect to the tooth base and center portion of the spider tine. A first set of teeth have flared paddles angled in a first direction and a second set have flared paddles angled in a direction opposite said first direction, with the first set being alternately positioned with the second set in a circumferential pattern around the peripheral edge of the spider tine.

9 Claims, 4 Drawing Sheets

(56) References Cited

U.S. PATENT DOCUMENTS

| | | | | |
|---|---|---|---|---|
| 2,575,321 A | * | 11/1951 | Traver | A01B 23/00 |
| | | | | 172/555 |
| 2,691,933 A | | 10/1954 | Emerson | |
| 4,191,259 A | * | 3/1980 | Boren | A01B 33/028 |
| | | | | 172/27 |
| 4,250,968 A | * | 2/1981 | Fox | A01B 33/103 |
| | | | | 172/555 |
| 4,386,661 A | * | 6/1983 | McCanse | A01B 33/021 |
| | | | | 172/103 |
| 4,421,176 A | * | 12/1983 | Tuggle | A01B 1/065 |
| | | | | 172/112 |
| 4,467,874 A | * | 8/1984 | Wittrock | A01B 33/021 |
| | | | | 172/548 |
| 5,048,616 A | * | 9/1991 | Hoff | A01B 33/028 |
| | | | | 172/120 |
| D518,491 S | * | 4/2006 | Vaughn | D15/28 |
| 7,063,165 B2 | * | 6/2006 | Bowsher | A01B 45/02 |
| | | | | 172/21 |
| D651,054 S | * | 12/2011 | Alex | D8/8 |
| 8,627,897 B2 | * | 1/2014 | Marcil | A01B 33/028 |
| | | | | 172/42 |

* cited by examiner

ROTARY SPIDER TINE FOR TILLAGE IMPLEMENT

CROSS REFERENCE TO RELATED APPLICATION

This application claims the benefit of U.S. Provisional Application No. 62/097,705, filed Dec. 30, 2014, and which is hereby incorporated by reference in its entirety.

BACKGROUND OF THE INVENTION

Field of Invention

This invention relates generally to agricultural implements and particularly to a soil working tine of the rotary type.

Description of Related Art

Most ground engaging wheels designed for use on agricultural implements have been designed such that the do a specific job without disturbing the top few inches of the soil. They usually do more for sizing residue than actually tilling the soil. A coulter blade, for example, will cut the residue but will only cut a slit in the top few inches of the soil. A wavy coulter blade will size and cut residue but still does not disturb the soil surface in what would be considered a traditional tillage operation. Other wheels have been designed to do more of an aeration operation rather than to size residue. These wheels simply create holes to help the drying process or to allow moisture to soak in rather than run off the field.

In some instances, it is desirable to have a tillage implement with a wheel design to actually work or disturb the top few inches of soil. It would be desirable to have a tool that moves soil to the right or left of the direction of travel in a more vertical direction.

OVERVIEW OF THE INVENTION

In one embodiment, the invention is directed to a tillage implement having a gang of rotary spider tines, each rotary spider tine having a center portion and a plurality of curved teeth extending outwardly from the center portion forming a peripheral edge of the spider tine. Each tooth having a curved leading edge and a curved trailing edge that taper to a rounded outward tip interconnecting the leading edge to the trailing edge and each tooth is rearwardly curving from the intended direction of rotation. A distal end of each tooth is angled relative to a tooth base to form a flared paddle such that the flared paddle is angled at an angle a with respect to a vertical axis through the tooth base and center portion of the spider tine. The plurality of teeth has a first set of teeth with flared paddles angled in a first direction and the plurality of teeth has a second set of teeth with flared paddles angled in a second direction opposite said first direction, with the teeth of said first set being alternately positioned with the teeth of said second set in a circumferential pattern around the peripheral edge of the spider tine.

Each flared paddle is formed with a substantially straight bend axis in its respective tooth, and the plurality of teeth is positioned around the spider tine such that when the bend axis of a tooth rotating through the six o'clock position of the spider tine, the bend axis is perpendicular to the ground surface at a position forward of a vertical centerline of the spider tine passing through the respective tooth base.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
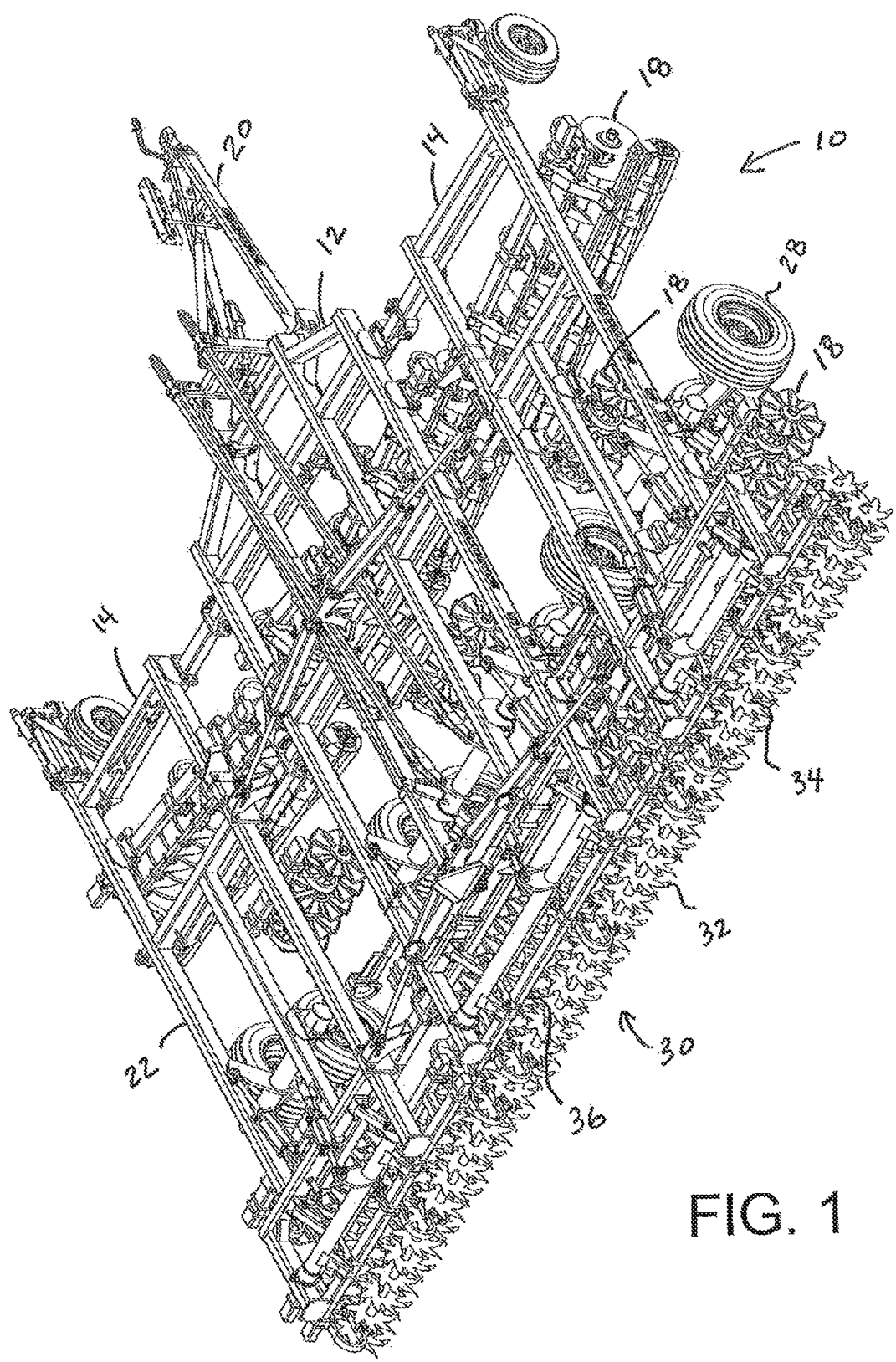
FIG. 1 is a perspective view of a tillage implement having a gang of rotary spider tines according to the invention.

The tillage implement 10 illustrated in FIG. 1 has been selected as but one of many different possible examples of machines with which the present invention may be utilized. In the illustrated embodiment, implement 10 is a three-section folding machine having a center section 12 and two outer wing sections 14 hingedly attached to respective outer ends of center section 12. As well known in the art, wing sections 14 can "flex" about respective fore-and-aft axes at hinge points so as to accommodate changes in ground contour experienced locally by the five sections of the machine. In addition, wing sections 14 can be raised into folded positions (not shown) utilizing hydraulic inner wing lift cylinders. Each of the sections 12, 14 carries tillage tools such as gangs of discs 18 for working the soil as the machine is advanced across a field. A tongue 20 projects forwardly from center section 12 for hitching the machine to a towing vehicle (not shown).

Each section 12, 14 has its own frame or chassis 22 to which the tillage tools of that section are attached. Each section 12, 14 also has its own undercarriage for supporting the chassis 22 during field operations and, in the case of the undercarriage of center section 12, supporting the load of essentially the entire machine during transport when wing sections 14 are folded up. The undercarriage for each section comprises a wheel assembly 28. According to the invention, tillage implement 10 carries a gang 30 of rotary spider tines 32. As would be understood by one skilled in the art, the gang 30 includes a shaft 34 on which the rotary spider tines 32 are mounted with suitable compressed bearings (not shown) and mounted to a toolbar 36 attached to the frame 22.

Figure 2:
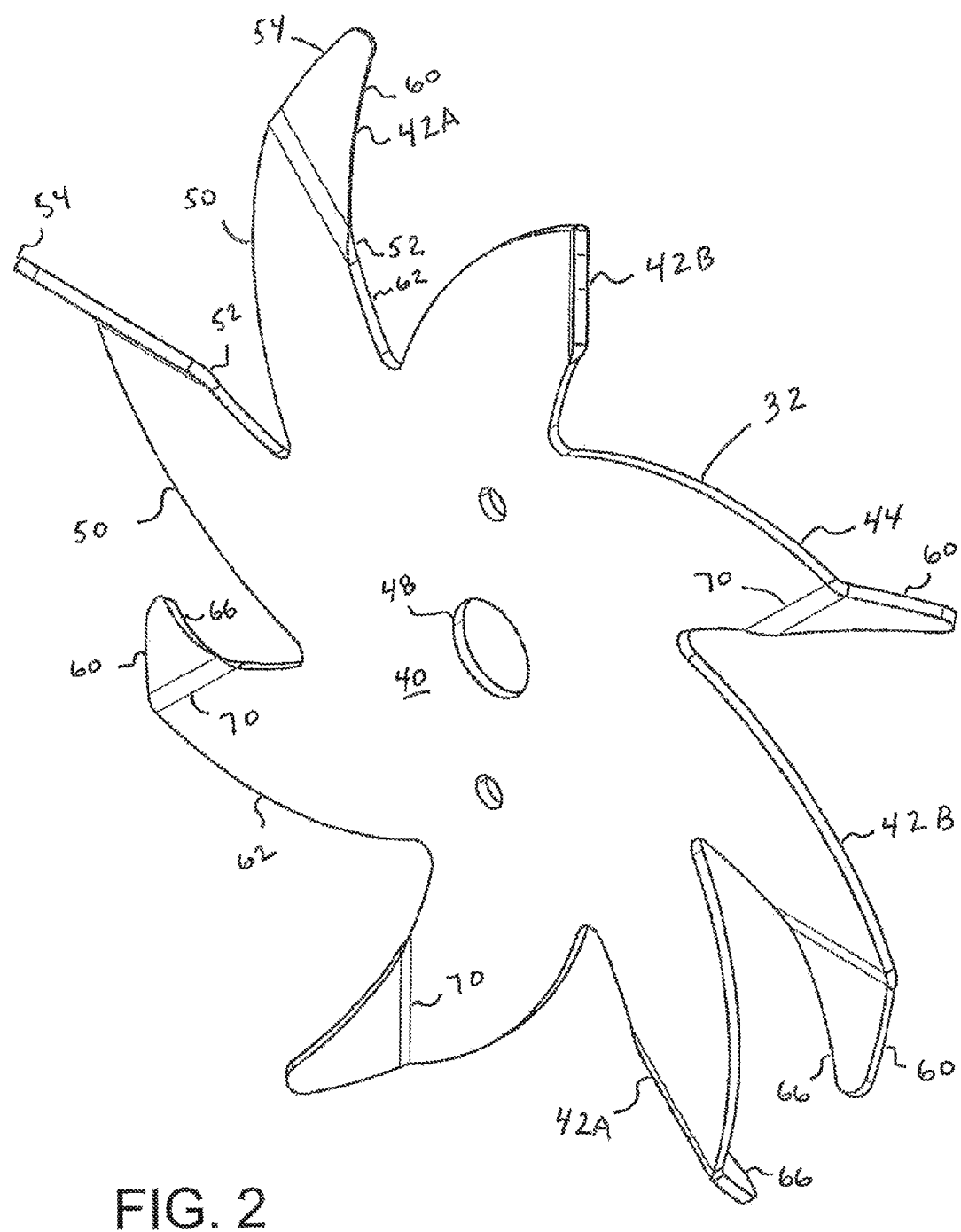
FIG. 2 is a perspective view of a rotary spider tine in accordance with the principles of the present invention.
Figure 3:
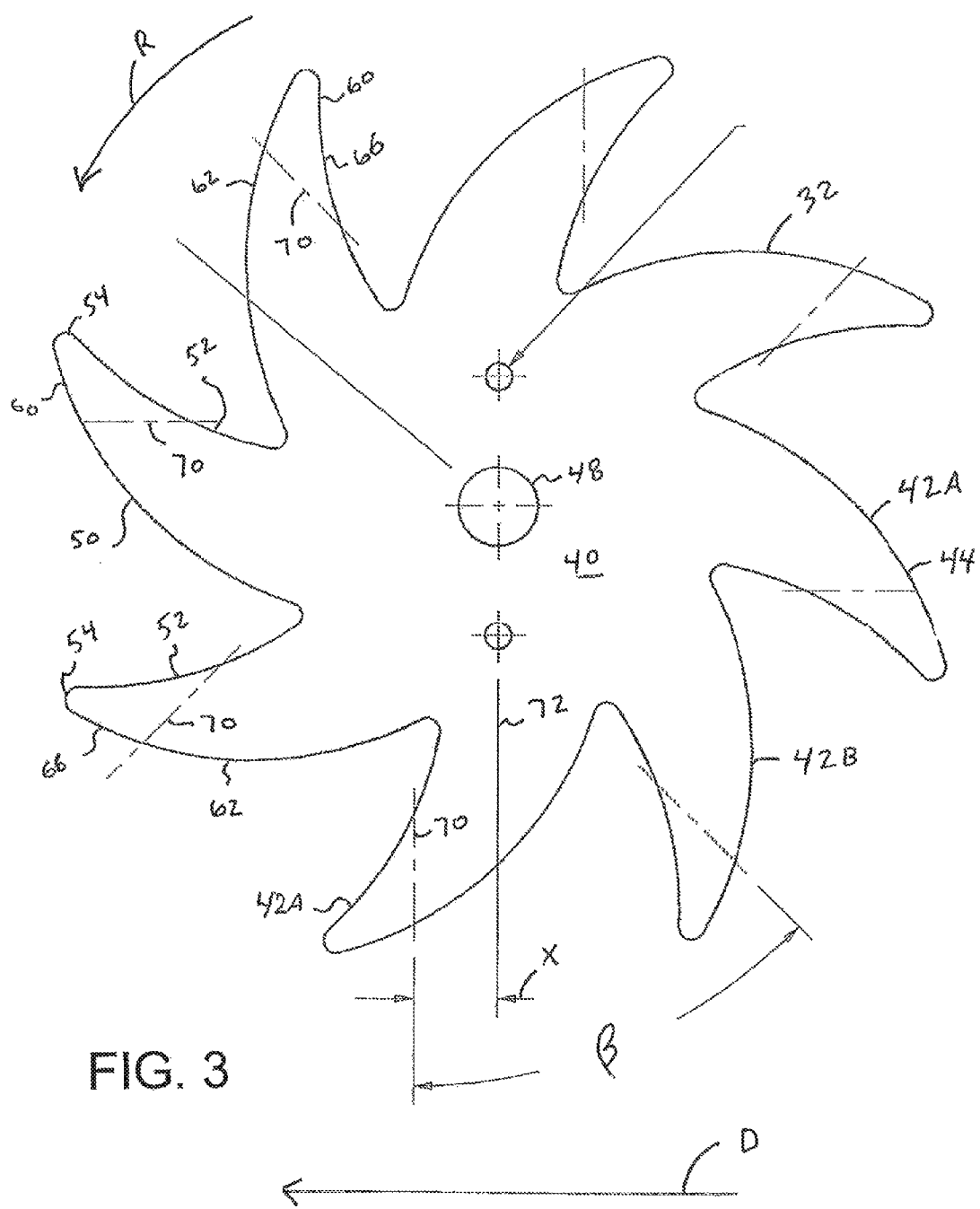
FIG. 3 is a side elevational view of the rotary spider tine of FIG. 2.

Referring now to FIGS. 2 and 3, each rotary spider tine 32 has a center portion 40 with a plurality of curved teeth 42A, 42B extending outwardly therefrom. Thus, the peripheral edge 44 of the spider tine 32 is formed of the number of individual curved teeth 42A, 42B. In the illustrated embodiment, there are eight teeth 42A, 42B space equally around the spider tine 32. The center portion 40 is substantially flat such that it lies in a plane and has a central aperture 48 through which the supporting shaft 34 is positioned.

The teeth 42A, 42B of the spider tines 32 each include a curved leading edge 50 and a curved trailing edge 52 that taper to a rounded tip 54 interconnecting the leading edge 50 to the trailing edge 52. The teeth 42A, 42B are rearwardly curving from the intended direction of rotation. Referring to the view of FIG. 3, the spider tine 32 is intended to rotate in a counter clockwise direction on the shaft as shown by the arrow R while being drawn across the soil in the direction of the arrow D.

Figure 4:
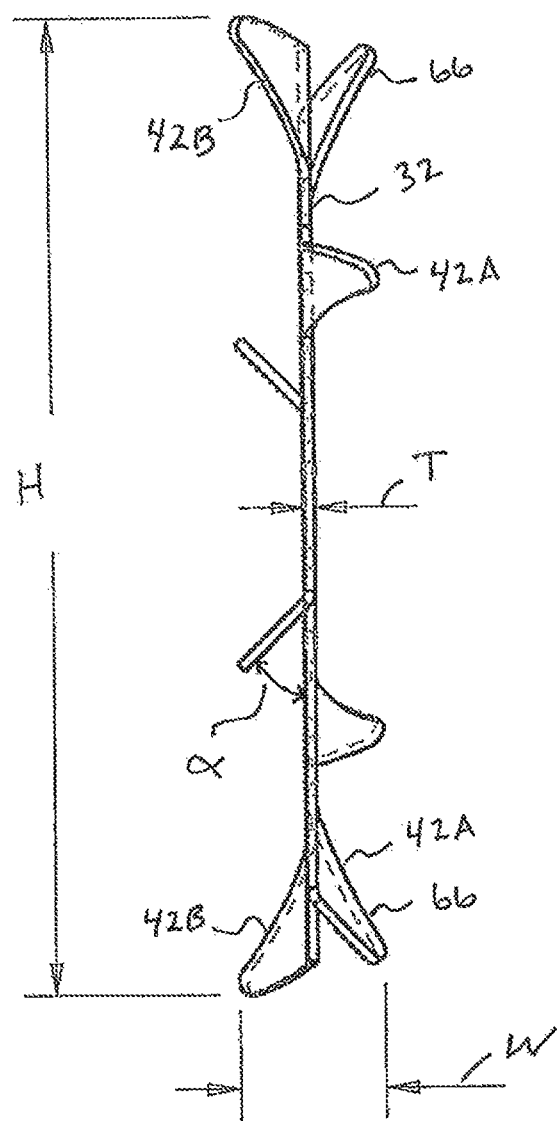
FIG. 4 is a front elevational view of the rotary spider tine of FIG. 4.

As best seen in FIGS. 2 and 4, a distal end 60 of each tooth 42A, 42B is bent or angled relative to a tooth base 62 so as to form a flared paddle 66. The flared paddle 66 of each tooth 42A, 42B is angled at an angle a with respect to a plane having a vertical axis 56 through the tooth base 62 and the center portion 40 of the spider tine 32. The teeth 42A are angled outwardly in one direction and the teeth 42B angled outwardly in an opposite direction, with the teeth 42A, 42B being alternately positioned in a circumferential pattern around the peripheral edge 44 of the spider tine 32. In the illustrated embodiment, the flared paddle 66 of teeth 42A, 42B are angled outwardly at an angle a of approximately 45 degrees; but it is understood that the flared paddle 66 could extend at other angles. However, it is generally preferred that the angle a be between approximately 30 degrees and approximately 50 degrees. In one embodiment, the flared paddles 66 give each spider tine 32 a width W of about 2.6 inches (6.6 cm) with a height H of about 17.2 inches (43.8 cm). However, one skilled in the art will understand that the spider tine 32 can have larger or smaller widths W and heights H without departing from the scope of the invention. Desirably, the teeth 42A, 42B a thickness T as the center portion 40 of the spider tine 32 and may be stamped from a single piece of metal.

In one embodiment, each flared paddle 66 is formed with a substantially straight bend axis 70 in the tooth 42A, 42B. Referring to FIG. 3, the teeth 42A, 42B are positioned around the spider tine 32 such that when the bend axis 70 of the tooth 42A rotating through the six o'clock position of the spider tine 32 is perpendicular to the ground surface, the bend axis 70 is at a position forward of a vertical centerline 72 of the spider tine 32 passing through the tooth base 62. In one embodiment, the bend axis 70 is positioned in the tooth 42A, 42B such that it is a distance X forward of the vertical centerline 72, where distance X is about 1.6 inches (4.1 cm) when perpendicular to the ground. Also, in the embodiment with eight teeth 42A, 42B, the bend axes 70 of adjacent teeth 42A, 42B are separated by an angle β of 45 degrees around the circumference of the spider tine 32. This orientation has been found to permit the flared paddle 66 on the teeth 42A, 42B of the spider tine 32 to pull a clump of dirt with it as it leaves the ground.

In the illustrated embodiment, the spider tines 32 are oriented such that the engagement with the ground is nearly vertical with respect to the soil. Desirably, the spider tines 32 are positioned within ten degrees of vertical. However, broader angles may also be utilized without departing from the scope of the invention. Furthermore, the spider tines 32 are oriented parallel with respect to the direction of travel. Desirably, the spider tines 32 are positioned within ten degrees of the direction of travel. However, broader angles may also be utilized without departing from the scope of the invention.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A tillage implement comprising a gang of rotary spider tines, each rotary spider tine comprising a center portion and a plurality of curved teeth extending outwardly from the center portion forming a peripheral edge of the spider tine, each tooth rearwardly curving from the intended direction of rotation and having a curved leading edge and a curved trailing edge that taper to a rounded outward tip interconnecting the leading edge to the trailing edge, wherein a distal end of each tooth is angled relative to a tooth base to form a flared paddle such that the flared paddle is angled at an angle a with respect to a plane through the tooth base and the center portion of the spider tine, and wherein said plurality of teeth comprises a first set of teeth with flared paddles angled in a first direction and said plurality of teeth comprises a second set of teeth with flared paddles angled in a second direction opposite said first direction, with the teeth of said first set being alternately positioned with the teeth of said second set in a circumferential pattern around the peripheral edge of the spider tine, wherein each flared paddle is formed with a substantially straight bend axis in its respective tooth, and the plurality of teeth is positioned around the spider tine such that when the bend axis of a tooth rotating through the six o'clock position of the spider tine, the bend axis is perpendicular to the ground surface at a position forward of a vertical centerline of the spider tine passing through the respective tooth base.

2. The tillage implement of claim 1 wherein each spider tine has eight teeth space equally around an outer periphery of the spider tine.

3. The tillage implement of claim 1 wherein the center portion of each spider tine has a central aperture through which a supporting shaft is positioned.

4. The tillage implement of claim 1 wherein the flared paddle of each tooth is angled at an angle of 45 degrees.

5. The tillage implement of claim 1 wherein the spider tines are oriented such that the engagement with the ground is nearly vertical with respect to the soil and oriented parallel with respect to the direction of travel.

6. A spider tine for use on a tillage implement the rotary spider tine comprising a center portion and a plurality of curved teeth extending outwardly from the center portion forming a peripheral edge of the spider tine, each tooth rearwardly curving from the intended direction of rotation and having a curved leading edge and a curved trailing edge that taper to a rounded outward tip interconnecting the leading edge to the trailing edge, wherein a distal end of each tooth is angled relative to a tooth base to form a flared paddle such that the flared paddle is angled at an angle a with respect to a plane through the tooth base and the center portion of the spider tine, and wherein said plurality of teeth comprises a first set of teeth with flared paddles angled in a first direction and said plurality of teeth comprises a second set of teeth with flared paddles angled in a second direction opposite said first direction, with the teeth of said first set being alternately positioned with the teeth of said second set in a circumferential pattern around the peripheral edge of the spider tine, wherein each flared paddle is formed with a substantially straight bend axis in its respective tooth, and the plurality of teeth is positioned around the spider tine such that when the bend axis of a tooth rotating through the six o'clock position of the spider tine, the bend axis is perpendicular to the ground surface at a position forward of a vertical centerline of the spider tine passing through the respective tooth base.

7. The spider tine of claim 6 wherein each spider tine has eight teeth space equally around an outer periphery of the spider tine.

8. The spider tine of claim 6 wherein the center portion of each spider tine has a central aperture through which a supporting shaft is positioned.

9. The spider tine of claim 6 wherein the flared paddle of each tooth is angled at an angle of 45 degrees.

* * * * *